United States Patent [19]
Catchpole et al.

[11] 4,342,220
[45] Aug. 3, 1982

[54] ENGINE TESTING METHOD AND APPARATUS

[76] Inventors: Charles R. Catchpole; Michael E. Horton, both of Box 20042, Billings, Mont. 59104

[21] Appl. No.: 172,388

[22] Filed: Jul. 25, 1980

[51] Int. Cl.³ ............................................. G01M 3/10
[52] U.S. Cl. ..................................... 73/49.7; 73/45.8
[58] Field of Search ............. 73/49.7, 45.8, 40, 40.5 R

[56] References Cited

U.S. PATENT DOCUMENTS

| | | | |
|---|---|---|---|
| 2,784,731 | 3/1957 | Bealer | 73/40 X |
| 3,213,672 | 10/1965 | Orr | 73/45.8 |
| 3,266,297 | 8/1966 | Powers | 73/49.7 |
| 3,834,220 | 9/1974 | Westmoreland | 73/49.7 X |
| 4,114,425 | 9/1978 | Hicks | 73/49.7 X |

*Primary Examiner*—Charles A. Ruehl
*Assistant Examiner*—Joseph W. Roskos
*Attorney, Agent, or Firm*—Arthur L. Urban

[57] ABSTRACT

A method of testing an engine aftercooler without removing it from the engine, the method including the steps of exposing the air inlet of the aftercooler, applying a gas under a superatmospheric pressure to the air chamber of the aftercooler, maintaining the gas pressure at a predetermined level, monitoring the liquid in the liquid chamber of the aftercooler, whereby the presence of leaks in the aftercooler can be determined by observing the evolution of bubbles from the liquid in the aftercooler.

Testing apparatus for an engine including an aftercooler and a turbocharger, the apparatus including an adapter capable of being operatively connected to the air chamber section of the aftercooler, fasteners engageable with the adapter capable of securing the adapter to the engine, a passage through the adapter, mechanism for supplying a gas under superatmospheric pressure through the adapter, pressure measuring mechanism associated with the gas supplying mechanism, and pressure relief mechanism associated with the gas supplying mechanism, whereby securing the adapter to the engine and supplying gas under superatmospheric pressure through the apparatus to the air chamber of the aftercooler will cause the pressurized gas to be forced through any flaws in the aftercooler and produce bubbles in a liquid medium disposed on the opposite side of the aftercooler from the air chamber.

8 Claims, 4 Drawing Figures

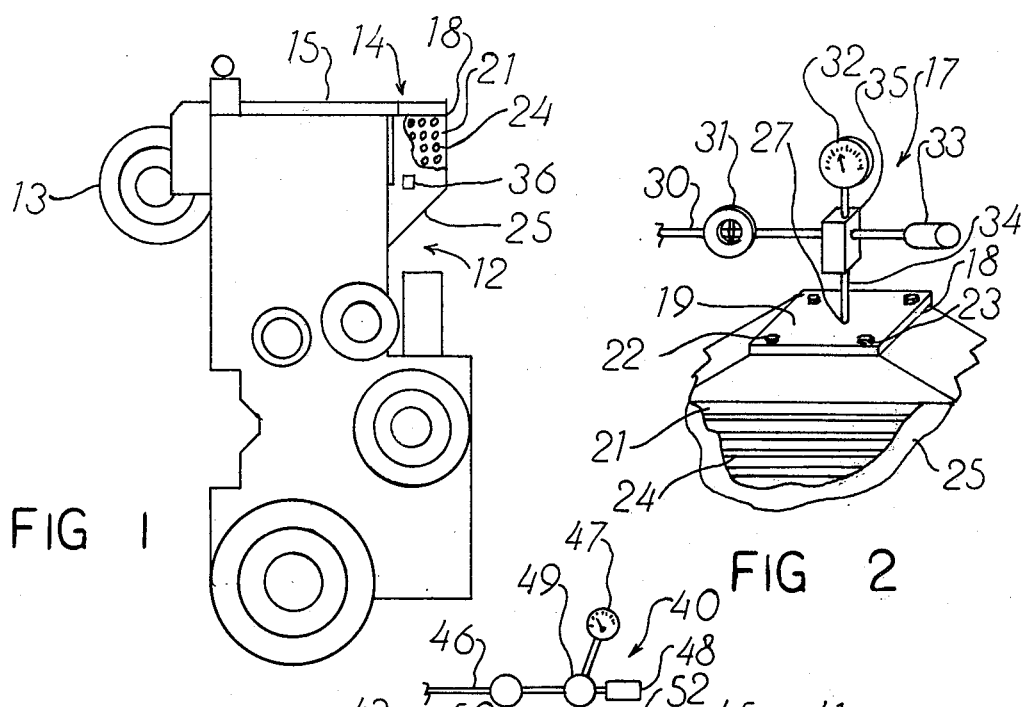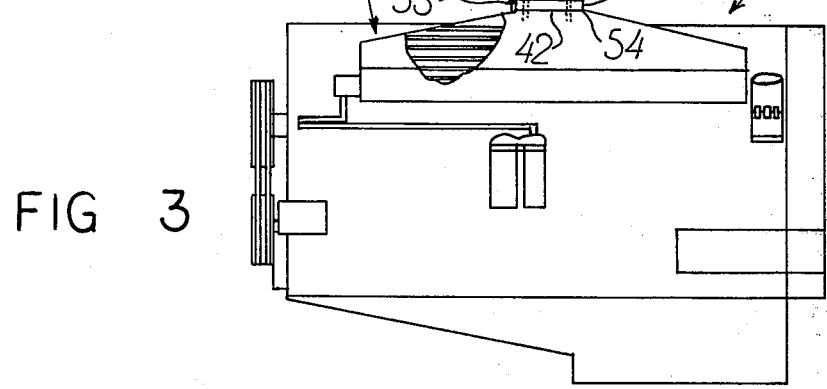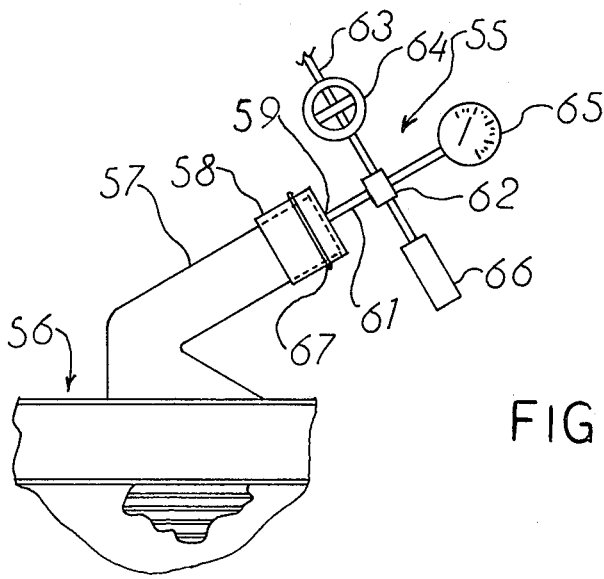

ENGINE TESTING METHOD AND APPARATUS

This invention relates to a novel engine testing method and also relates to a new apparatus for testing internal combustion engines.

Internal combustion engines have been in use for many years. Such engines have become standard as the power source of vehicles. Also, engines have been used for other applications such as generators and the like. Many changes have been made through the years in the design of internal combustion engines.

Originally, vehicles were novelties which motorists used for a Sunday drive and similar excursions. Vehicles were not used to any extent for business or any endeavor that required dependable performance. They had to be babied and required considerable maintenance. In cold weather climates, vehicles generally were stored for the winter season.

Some farsighted individuals realized the possible uses of vehicles and started using them for business and other important activities of their lives. This created a demand for vehicles which could withstand rough and long term use without breakdowns or extensive maintenance.

One area in which top performance with a minimum of maintenance was considered to be essential was in trucks. Truck owners rely on their vehicles to help them in producing income and if the truck was down for repairs it could not accomplish this purpose. Thus, truck manufacturers have devoted a great deal of effort to manufacture a durable truck which requires a minimum of maintenance.

Another consideration of truck owners is the payload that a truck can haul in a given period of time. The more payload a truck can haul, the more income the truck can generate. One of the problems in designing engines which will generate more power is keeping the engine from overheating. To minimize the chance of overheating, extra engine cooling capacity is required. One common means for achieving extra cooling is to include an aftercooler with the engine. The aftercooler acts as an extra radiator to cool the turbocharger air and the coolant flowing through the engine.

Aftercoolers are employed in combination with turbochargers. Turbochargers are used to generate additional engine power by forcing air under pressure into the combustion chambers of the engine. Air from the turbocharger is forced through the aftercooler so that the compressed air serves both as a cooling medium and also as a supply of combustion air.

The use of aftercoolers, however, can present problems. If a leak should develop in the aftercooler, the truck will be down for repairs a considerable period of time. Ordinarily, the engine must be torn down to remove the aftercooler, then the aftercooler is sent to a radiator shop for inspection and repairs, and after being repaired is returned back to the truck service shop for reinstallation of the aftercooler and reassembly of the engine. This work can take several days or more depending upon the backlog of the radiator shop.

Even if the aftercooler is not defective, the mechanic must go through the same sequence of steps since only the radiator shop determines if the aftercooler is leaking. Thus, the engine still must be torn down, the aftercooler sent to the radiator shop, inspected, returned to the mechanic, reinstalled and the engine reassembled. The down time is almost the same with only the repair time being omitted.

If the aftercooler is not found to be defective on inspection at the radiator shop, the mechanic after reinstalling the aftercooler then must take still more time to determine what is wrong with the truck engine. The diagnosis and the necessary repairs cause still additional down time for the truck. All of this down time is time that the truck cannot produce any income. In addition to the lost income, there also is the major expense of the mechanic's time in doing all of the above engine tear down and reassembly.

The present invention provides a novel method and apparatus for the testing of aftercoolers. The method of the invention permits the testing of an aftercooler to be performed while it still is in the engine. The aftercooler can be tested for leakage simply and conveniently in a short period of time. The testing can be done with a high degree of accuracy.

The method and apparatus of the present invention for testing an aftercooler significantly reduces the time that a truck must be disabled and thus reduces the lost income for the truck owner. Furthermore, the expense for repairs is significantly reduced.

The aftercooler testing apparatus of the invention is simple in design and relatively inexpensive to manufacture. The apparatus can be fabricated from commercially available components and materials using semi-skilled labor and conventional assembly techniques. The apparatus can be used conveniently even by less experienced mechanics after only a minimum of instruction.

Other benefits and advantages of the novel engine testing method and apparatus of the present invention will be apparent from the following description and the accompanying drawings in which:

FIG. 1 is a schematic end view of one form of engine suitable for testing with the apparatus of the invention;

FIG. 2 is a fragmentary right side view of one form of the testing apparatus of the invention mounted on the engine shown in FIG. 1;

FIG. 3 is a schematic side view of another engine with testing apparatus of the invention mounted thereon; and FIG. 4 is an enlarged side view of another form of the testing apparatus of the invention mounted on a different engine.

In FIG. 1 is illustrated schematically a Cummins diesel engine 12. The engine 12 includes a turbocharger 13 and an aftercooler 14. As shown in FIG. 2, duct 15 has been removed from the engine 12 and testing apparatus 17 of the invention connected to top opening 18 of the aftercooler 14.

The testing apparatus 17 includes an adapter portion shown as plate 19. The plate 19 is secured to the opening 20 of the air chamber section 21 of the aftercooler 14 with suitable fastening means shown as bolts 22 which pass through openings 23 in the adapter plate 19. The aftercooler 14 includes a finned core 24 with a large surface area. Ordinarily, a liquid coolant circulates between the outer finned surface 24 and the housing 25 of the aftercooler.

The adapter plate 19 has a passage 27 extending therethrough. Means are included in the testing apparatus 17 for supplying a gas through the adapter plate 19. The gas supplied is a gas under superatmospheric pressure. The gas supply means shown as air line 30 may be connected to a conventional pressure gas source (not shown) such as an air compressor, a cylinder of pressurized gas or the like. Advantageously, the gas supplying means 30 includes valve means 31 for regulating the flow of gas through the adapter plate 19.

Pressure measuring means shown as gauge 32 is associated with gas supplying means 30. The testing apparatus 17 further includes pressure relief means such as relief valve 33 associated with the gas supplying means 30.

In a preferred form of the testing apparatus of the invention, the gas supplying means 30, the pressure measuring means 32 and the pressure relief means 33 are connected to conduit means 34 at substantially a common point. As shown, the conduit 34, the air line 30, pressure gauge 32 and the relief valve 33 are oriented symmetrically about a common junction block 35 in a cross configuration. The junction block 35 has appropriate passages therethrough.

FIG. 3 illustrates a testing apparatus 40 of the invention mounted on a Caterpillar engine 41. The testing apparatus is mounted on an opening 42 of aftercooler 43. The opening 42 is exposed when a duct (not shown) connecting turbocharger 44 with the aftercooler 43 is removed.

Testing apparatus 40 includes an adapter plate 45, an air supply line 46, a gauge 47 and a relief valve 48 similar to the apparatus shown in FIG. 2. These components are interconnected through a connector 49 and a conduit 50 to the aftercooler 43. The apparatus is secured to an opening 42 of the aftercooler by means of bolts 52 which extend through openings 53 around the periphery of the adapter plate 45 and are threaded into the aftercooler housing 54.

In FIG. 4 is shown a fragmentary view of testing apparatus of the invention 55 mounted on a Detroit Diesel engine 56. The apparatus 55 is affixed to a manifold 57 which ordinarily is connected to a turbocharger (not shown). The duct (also not shown) is removed from the manifold 57 and replaced with the testing apparatus 55.

The testing apparatus 55 includes adapter means shown as a cap 58. Cap 58 has a passage 59 therethrough to which is affixed a conduit 61. The opposite end of the conduit 61 has a junction block 62 thereon. To the junction block 62 are connected an air line 63 with a regulating valve 64 as well as a pressure gauge 65 and a relief valve 66. The components are arranged in a generally cross-shaped configuration. The cap 58 is secured in position on the manifold 57 with suitable fastening means such as clamp 67.

In the use of the testing apparatus of the present invention as shown in FIGS. 1 and 2 of the drawings, the apparatus 17 is mounted on the engine 12 by first removing the duct 15 connecting the turbocharger 13 with the aftercooler 14 from the engine. After the duct 15 has been removed, the testing apparatus is mounted on the opening 18 of the aftercooler which has become exposed by the removal of the duct.

The testing apparatus 17 is mounted on the engine 12 by securing adapter plate 19 to the opening 18 of the air chamber section 21 of the aftercooler 14. The apparatus is secured to the aftercooler housing 25 with bolts 22. Thereafter, the air supply line 30 is connected to a suitable source of compressed air (not shown).

In the operation of the testing apparatus 17, regulating valve 31 is opened sufficiently to pressurize the air chamber section 21 of the aftercooler 14. It has been found that a gauge pressure of about 25 to 35 psi provides desired results. When the pressure has stabilized, the outlet 36 of the liquid chamber of the aftercooler 14 or the radiator is checked for any air bubbling from the liquid. If so, the mechanic knows that the aftercooler has a leak, and he can proceed with its removal for repair or replacement. However, if no bubbles appear, the mechanic knows that the aftercooler is not causing trouble and he can quickly proceed with other testing of the engine.

The testing apparatus shown in FIGS. 3 and 4 are used in the same way with the turbocharger ducts being removed and the testing apparatus 40 or 55 mounted on the engine as described above.

In addition to diagnosing leaks in aftercoolers, the testing apparatus also may be useful in the diagnosis of leaking gaskets, bad valves and similar engine problems. This may be accomplished by pressurizing the air intake of an engine and observing if there are bubbles in the coolant and/or there is significant drop in the pressure of the system.

The above description and the accompanying drawings show that the present invention provides a novel method and apparatus for testing engines. The method and apparatus of the invention enable aftercoolers to be tested for leaks without removing the aftercoolers from the engines. The testing can be accomplished quickly and conveniently.

The testing method and apparatus of the invention enables aftercoolers to be tested in a short period of time so that the engine and the vehicle in which they are installed can be restored to service more quickly. Thus, the method and apparatus minimize the down time and the resultant loss in income generated by the vehicle. In addition, the expense of repairs is significantly reduced.

The aftercooler testing apparatus of the present invention is simple in design and relatively inexpensive. The apparatus can be fabricated from commercially available components and materials using conventional assembly techniques. The method and apparatus of the invention can be used for testing aftercoolers conveniently by mechanics with limited experience after only a minimum of instruction.

It will be apparent that various modifications can be made in the particular testing method and apparatus described in detail and shown in the drawings within the scope of the invention. The size and configuration of components can be different. Also, the arrangement of components can be changed to meet specific requirements provided the functioning of the apparatus is not adversely affected. For example, the components can be mounted directly on the adapter plate, if desired. Therefore, the scope of the invention is to be limited only by the following claims.

What is claimed is:

1. Testing apparatus for an engine including an aftercooler and a turbocharger, said apparatus including adapter means capable of being operatively connected to the air chamber section of said aftercooler, fastening means engageable with said adapter means capable of securing said adapter means to said engine, a passage through said adapter means, means for supplying a gas under superatmospheric pressure through said adapter means, pressure measuring means associated with said gas supplying means, and pressure relief means associated with said gas supplying means, whereby securing said adapter means to said engine and supplying gas under superatmospheric pressure through said apparatus to said air chamber of said aftercooler will cause the pressurized gas to be forced through any flaws in said aftercooler and produce bubbles in a liquid medium disposed on the opposite side of said aftercooler from said air chamber.

2. Engine testing apparatus according to claim 1 wherein said gas supplying means includes regulating valve means.

3. Engine testing apparatus according to claim 1 wherein said adapter means includes a plate with a plurality of bolt openings around the periphery thereof.

4. Engine testing apparatus according to claim 1 wherein said adapter means includes cap means and clamp means securing same.

5. Engine testing apparatus according to claim 1 wherein said gas supplying means is connected to said adapter means through conduit means, and said pressure measuring means and said pressure relief means are connected to said conduit means at substantially the same point as said gas supplying means.

6. Engine testing apparatus according to claim 5 wherein said gas supplying means, said pressure measuring means, said pressure relief means, and said conduit means are arranged in a cross configuration.

7. A method of testing an aftercooler of an engine including a turbocharger without removing said aftercooler from said engine, said method including the steps of disconnecting means connecting said turbocharger with said aftercooler to expose an air inlet of said aftercooler, mounting testing apparatus on said exposed air inlet of said aftercooler, said testing apparatus including means for supplying a gas under superatmospheric pressure, pressure measuring means and pressure relief means; supplying a gas under superatmospheric pressure through said apparatus to an air chamber of said aftercooler, maintaining said gas pressure at a predetermined level, monitoring liquid in a liquid chamber of said aftercooler, whereby the presence of a leak in said aftercooler can be determined by observing the evolution of bubbles from said liquid in said aftercooler.

8. A method of testing an engine aftercooler according to claim 7 wherein said gas pressure is maintained between about 25 and 35 psi.

* * * * *